United States Patent [19]
Rösch et al.

[11] Patent Number: 5,883,376
[45] Date of Patent: Mar. 16, 1999

[54] DEVICE FOR CONTACTLESS, INDUCTIVE POWER AND DATA TRANSMISSION, AND PREFERRED USE THEREOF FOR IDENTIFYING GAS CYLINDERS

[75] Inventors: Jürgen Rösch, Hallbergmoos; Günter Jakesch, Nürnberg, both of Germany

[73] Assignee: Siemens Aktiengesellschaft, München, Germany

[21] Appl. No.: 809,335

[22] PCT Filed: Sep. 21, 1995

[86] PCT No.: PCT/DE95/01299

§ 371 Date: Jun. 9, 1997

§ 102(e) Date: Jun. 9, 1997

[87] PCT Pub. No.: WO96/09595

PCT Pub. Date: Mar. 28, 1996

[30] Foreign Application Priority Data

Sep. 21, 1994 [DE] Germany ............... 44 33 701.9

[51] Int. Cl.⁶ .................. G06K 19/06; G06F 17/00
[52] U.S. Cl. ........................... 235/492; 235/375
[58] Field of Search ................. 235/462, 492, 235/486, 380, 382, 384, 375, 449

[56] References Cited

U.S. PATENT DOCUMENTS

| | | | |
|---|---|---|---|
| 4,911,217 | 3/1990 | Dunn et al. ............... | 152/152.1 |
| 5,539,188 | 7/1996 | Fallah et al. ............... | 235/375 |
| 5,583,330 | 12/1996 | Fallah et al. ............... | 235/449 |
| 5,587,578 | 12/1996 | Serra ............... | 235/492 |
| 5,731,762 | 3/1998 | Gila et al. ............... | 340/825.54 |

FOREIGN PATENT DOCUMENTS

| | | |
|---|---|---|
| 0 586 083 A2 | 3/1994 | European Pat. Off. . |
| WO 93/13494 | 7/1993 | WIPO . |
| WO 95/15622 | 6/1995 | WIPO . |

*Primary Examiner*—Thien Minh Le
*Attorney, Agent, or Firm*—Kenyon & Kenyon

[57] ABSTRACT

A system containing a writing and reading unit with an antenna coil and at least one preferably elastic carrier in the form of a strip, on which is provided at least one mobile data memory which has a memory and operating circuit and, connected thereto, an elongate loop coil. The arrangement has the advantage that the mobile data memory can be provided on surfaces having virtually any degree of undulation. If a mobile data memory of this type encloses the circumference of a cylindrical object, then data transmission can be carried out in any desired radial spatial direction. The device is particularly suitable for identifying gas cylinders, in which case the elastic carrier, in the form of a strip, of a mobile data memory is placed around the casing of each gas cylinder, particularly in the region of the neck rings thereof.

8 Claims, 2 Drawing Sheets

DEVICE FOR CONTACTLESS, INDUCTIVE POWER AND DATA TRANSMISSION, AND PREFERRED USE THEREOF FOR IDENTIFYING GAS CYLINDERS

BACKGROUND INFORMATION

The invention relates to a device for contactless, inductive power and data transmission between at least one writing and reading unit with an antenna coil, and at least one mobile data memory, which is preferably fitted to a portable object, with an antenna coil. The principle of a contactless transmission path of this type corresponds to a transformer with a coupling factor which varies as a function of distance.

In the case of such devices, which are frequently referred to as identity systems, a mobile data memory is first of all supplied with power in a contactless manner by means of a writing and reading unit for the purposes of activation and for enabling a data exchange. This is done inductively in that a magnetic alternating field is generated in the surrounding space by an antenna coil belonging to the writing and reading unit. When an object having a mobile data memory fitted thereon enters the magnetic alternating field, a voltage is induced in the antenna coil thereof. This provides the power required to operate the mobile data memory. The data transmission which is now possible between the writing and reading unit and the mobile data memory also takes place inductively via the two antenna coils. Information identifying the type and the current condition of the object provided with the respective mobile data memory is, as a rule, communicated as data to the writing and reading unit for a wide variety of purposes.

The maximum distance between the mobile data memory and the writing and reading unit is, as a rule, up to one meter and, in practice, depends on the dimensions of the antenna coils of the writing and reading unit and the mobile data memory and on the respective ambient conditions. Particular problems arise when electrically conductive materials are present in the region of the alternating field, since the eddy currents induced therein cause the antenna resonant circuits of the writing and reading unit and/or of the mobile data memory to be detuned and/or the magnetic alternating field to be completely shielded from the antenna coil of the mobile data memory. As a result, the maximum range of the data transmission can be restricted right up to the point of complete interruption of said data transmission. A particularly unfavorable situation is when a metallic surface of an object must serve as support for a mobile data memory.

To solve this problem, it is admittedly possible to fit a mobile data memory by means of special mounts in such a way that an adequate distance from the electrically conductive surroundings or support is maintained. This ensures that the inductive power and data transmission is influenced as little as possible by the otherwise occurring resonant frequency shifts in the antenna resonant circuits of the mobile data memory or the writing and reading unit. However, it is disadvantageous that the mobile data memories project sometimes to a large extent over the outer surfaces of the objects and, consequently, there is a considerable risk of breaking. Furthermore, mounts protruding in this way will make it more difficult to transport and use, in particular, objects which are difficult to handle on account of their shape, for example, and, if appropriate, have a high dead weight.

If a mobile data memory is fastened to a preferably portable object to be identified, then data transmission without additional positioning operations is only possible if the sum of the minimum distance to be maintained between the mobile data memory and the writing and reading unit and the largest edge lengths thereof is always less than the range of the device under the respective ambient conditions. Only in simple cases, however, is it ensured that the mobile data memory, when manually or automatically approaching the writing and reading unit, is always situated in the field region thereof in a manner independent of position. Further problems thus arise in the case of parallelepipedal objects having relatively large dimensions or in the case of objects having curved outer surfaces. In this case, prior positioning is frequently required for an automated data exchange, for example, where an object that is provided with a mobile data memory travels on a conveyor belt past a stationary writing and reading unit. It is therefore necessary, under certain circumstances, that the object be rotated until a mobile data memory, situated on a remote side in the most unfavorable case, is facing the writing and reading unit. This is particularly difficult with objects which have a high dead weight or curved outer surface and the mobile data memories consequently have to be fitted on poorly definable, non-planar surfaces.

Further problems arise when a plurality of objects, each provided with a mobile data memory, are simultaneously brought up, for example on a pallet, in a box or other transport device, to a writing and reading unit. On the one hand, particularly when the objects have, for example, a cylindrical shape, the mobile data memories on some objects may randomly assume a position facing away from the respective writing and reading unit. A type of shading thus occurs, which is particularly pronounced in the case of objects produced from a metallic material. On the other hand, in conventional identity systems, as a rule only one mobile data memory is allowed to be situated in the magnetic alternating field of the writing and reading unit during the data exchange, in order to maintain proper functioning. Certain identity systems generate large magnetic fields within which the data exchange between a mobile unit and a writing and reading unit occurs. The relatively large magnetic fields produced by such systems permit the data exchange to occur largely independent of the relative positioning of the mobile unit and the writing and reading unit. Nevertheless, this advantage is nullified as soon as a plurality of objects are situated at a small distance from one another, for example in a common transport container. Due to this simultaneous presence of a plurality of mobile data memories in the field region of a writing and reading unit, it is no longer possible, without a (possibly considerable) additional software and hardware outlay, to set up a data transmission to each individual mobile data memory in an unambiguously distinguishable manner.

SUMMARY OF THE INVENTION

The present invention is directed to a device that provides for reliable data transmission between a mobile data memory and a writing and reading unit. The device of the present invention provides such a reliable data transmission independently of the current relative positions of the mobile data memory and the writing and reading unit, even when the mobile data memory is attached to an electrically conductive surface of an object and even when a plurality of other mobile data memories corresponding to other objects are positioned within the field range of the writing and reading unit.

BRIEF DESCRIPTION OF THE DRAWINGS

The invention and advantageous embodiments thereof are explained in more detail with reference to the figures, which are explained briefly below. In the figures

DETAILED DESCRIPTION

Figure 2:
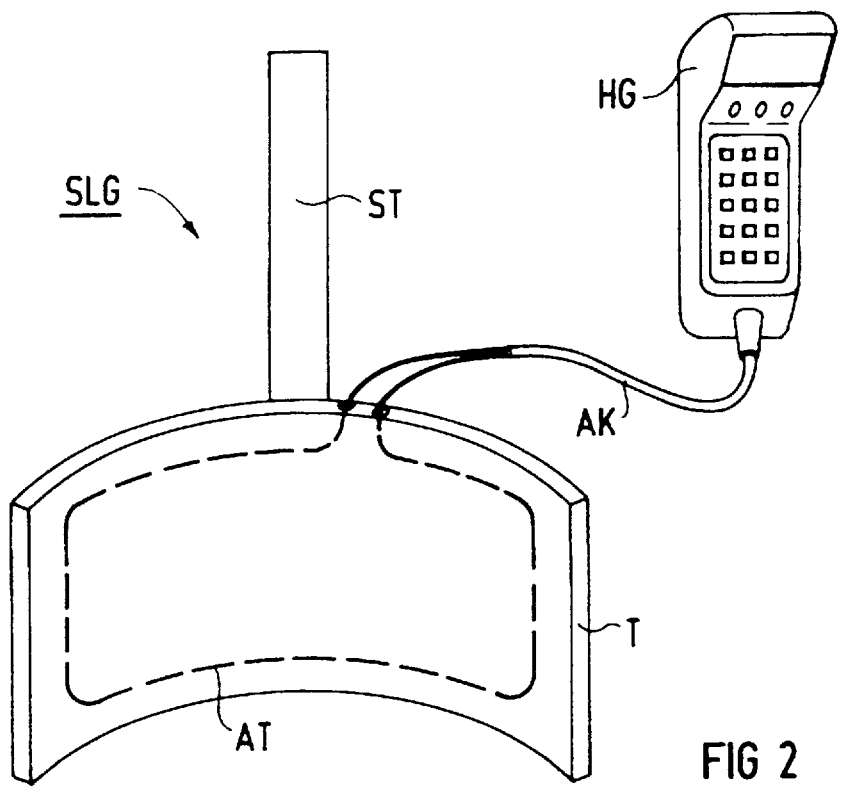
FIG. 2 shows a side view of a preferred embodiment of a writing and reading unit of the device according to the invention.

The device for contactless, inductive power and data transmission according to the invention contains at least one writing and reading unit with an antenna coil, and at least one mobile data memory which has a memory and operating circuit and, connected thereto, an elongate loop coil, which are provided on a preferably elastic carrier in the form of a strip. It is advantageously possible to use a flexible printed circuit board as the carrier in the form of a strip for the elongate loop coil. The arrangement has the advantage that the mobile data memory can be provided on surfaces having virtually any degree of undulation.

The device according to the present invention can preferably be used for identifying gas cylinders. The elastic carrier of a mobile data memory is in the form of a strip and is placed around the casing of each gas cylinder, particularly in the region of the neck rings thereof. As a result, it is possible, in every case and independently of the current radial position of a writing and reading unit with respect to the axis of a gas cylinder, to ensure reliable data transmission even if a plurality of gas cylinders should be standing close together in a crate serving as transport container. Since gas cylinders are composed of a metallic material, it is advantageous in this case that the carrier in the form of a strip for the elongate loop coil has a certain thickness, and that the loop coil is provided or incorporated on that side of the carrier which is remote from the neck ring of a gas cylinder. A flexible printed circuit board as the carrier in the form of a strip usually already has a thickness sufficient for this purpose.

The device according to the invention is thus preferably suitable for being fitted on and identifying objects which have a curved, in particular cylindrical, surface. If these objects are produced, for example, from an electrically non-conductive material, then the carrier in the form of a strip need not have an appreciable thickness. In such a case, an adhesive tape or an adhesive film, for example, can serve as the carrier. The elongate loop coil and the memory and operating circuit of each of the mobile data memories are placed on such a carrier. For transport purposes, these adhesive-tape-like carriers can be placed, for example, on cardboard-like supports, which are coated at least on one side, and can be drawn off from said supports, in a manner free from damage, for the purpose of final application to an object to be identified complete with a unit comprising an elongate loop coil and a memory and operating circuit. On account of the self-adhesive properties of the carrier, auxiliary means for retaining the carrier, such as locks, for example, are dispensed with in this case. It is also possible to provide a multiplicity of units, each comprising an elongate loop coil and an associated memory and operating circuit, one behind the other like a row on the adhesive side of a continuous adhesive tape, and to fabricate the latter in the form of adhesive rolls. With rolls of this type, it is then possible to equip, rapidly and without any appreciable outlay, a potentially very large number of objects, for example a stock of gas cylinders running into thousands, which are to be rendered accessible to contactless identification, with a mobile data memory configured according to the invention.

The invention and further advantageous embodiments thereof are explained in more detail with reference to a preferred exemplary embodiment illustrated in FIGS. 1 and 2.

Figure 1:
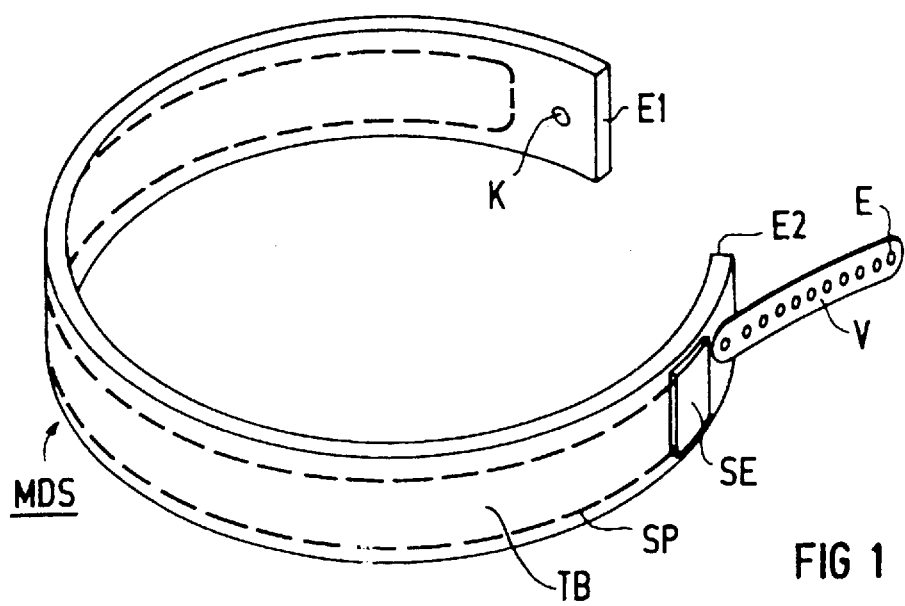
FIG. 1 shows a side view of a preferred embodiment of a mobile data memory of the device according to the invention.

According to the illustration in FIG. 1, the mobile data memory MDS has, according to the invention, an elastic carrier TB in the form of a strip. The antenna coil SP of the mobile data memory MDS is provided on said carrier. Said coil has the form of a planar, elongate loop coil. The coil may have a plurality of turns, which is not illustrated in FIG. 1 for reasons of clarity. The coil is closed at one short end side E1 of the carrier TB in the form of a strip, whereas at the other short end side E2 it is connected to a memory and operating circuit SE. The circuit serves, in particular, to store so-called identity data of an object provided with the mobile data memory, to supply power to the mobile data memory, and to enable inductive data transmission via the loop coil SP with a writing and reading unit. The elastic carrier TB in the form of a strip may advantageously be designed, for example, in the form of a flexible printed circuit board, on which the elongate loop coil SP and the memory and operating circuit SE can be provided directly, for example as a so-called ASIC.

The inventive design, which is illustrated by way of example in FIG. 1, of a mobile data memory MDS has a multiplicity of advantages. On the one hand, the inductance of the loop coil SP is independent of the curvature of the elastic carrier TB, in the form of a strip, in a plane lying perpendicular to the coil face, as long as there is no overlapping of the loop beginning and end at the short end sides E1, E2 of the carrier TB. The carrier TB and hence the entire mobile data memory MDS comprising loop coil SP and memory and operating circuit SE can, for the purpose of mounting, be placed onto a surface which is planar with regard to the short loop edge. This surface can have virtually any desired curvature or contour in the direction of the long loop edge. Thus, the carrier can be placed, for example, around a 90-degree edge of a parallelepipedal object, such as the edge of the housing of a refrigerator. It is then possible without any problems to effect data transmission in two perpendicular spatial directions. Furthermore, the mobile data memory MDS according to the invention is particularly suitable for being placed onto circularly curved surfaces, for example onto the outer sides of cylindrical objects. The carrier 7B can be formed into a variety of shapes: it can be formed into a flat and slotted shape, into an easily bent open or resilient ring, collar, or clasp, or even into a formless strip. Simple mounting is ensured in each of these designs. In an application for identifying cylindrical objects, such as bottles, for example, fitting is possible independently of the relevant radius of curvature and the circumference of the object. The area covered by the loop coil is in this case parallel to the surface of the object. If the cylindrical object is enclosed virtually completely, then data transmission is possible radially in all spatial directions around the axis of the cylindrical object.

The short end sides E1 and E2 of the elastic carrier TB in the form of a strip can advantageously be connected to a releasable closure device. FIG. 1 illustrates a closure device V in the form of a strap. Closure device V has a row of retaining holes E, and the closure device V is placed for this purpose on one short end side E2 of the carrier strip TB. On side E2, the retaining holes E engage a retaining stud K of the carrier TB, depending on the relevant circumference of a cylindrical object. device V may be designed such that it can be lead-sealed. On the other hand, the carrier TB can also be bonded on.

The distance between the plane of the loop coils SP and the surface of the object need only be a few millimeters, even in the event of electrical conductivity of said surface, with the result that it is possible to use elastic carriers in strip form which have only a small thickness. The enlargement of the diameter of the object by the emplaced mobile data memory is scarcely noticeable. When the mobile data memory is mounted on an electrically conductive surface, it is possible to compensate for the detuning of the mobile data memory caused by the electrically conductive surface by appropriately selecting the effective resonant circuit capacitance of the coil of the memory.

Writing and reading units can be permanently mounted and connected to an external computer. In the event of mobile use, they can also be designed in the form of portable hand-held units. FIG. 2 illustrates an example of a portable design of a writing and reading unit SLG. The latter contains a separate hand-held unit and serves for a type of "remote control" of mobile data memories. This preferably has an operating keyboard and a display device, in particular in the form of an LCD display, by means of which so-called "identity data" can be called from a mobile data memory and also updated and written back. The hand-held unit HG of the writing and reading unit SLG is connected via a connection cable AK to an antenna coil AT, which is preferably provided on a separate, elastic carrier T. A flexible printed circuit board is once again preferably suitable for this purpose and may advantageously have an approximately c-shaped cross section. By means of a retaining rod ST, the carrier T with the antenna coil AT of the writing and reading unit SLG can be brought in a simple manner into the spatial vicinity of a specific mobile data memory according to the invention even when the latter is fitted to an object which, for example, is packed close together with further objects of identical form in a transport container.

The device according to the invention is particularly suited to being used for identifying gas cylinders.

Gas cylinders are composed of electrically conductive materials and have a cylindrical shape with annularly curved outer surfaces of varying circumference. They are used in industry in very large numbers and are filled with a wide variety of technical gases which are required for extremely diverse purposes, for example in the chemical industry. Both the manufacturer of technical gases, which frequently has to manage a stock of gas cylinders comprising several million items, and the respective purchaser of technical gases have a considerable interest, both of an economical nature and in terms of safety, in an exact identification of each gas cylinder and the processing of the current specific characteristic values thereof. Significant technical characteristic values are, in particular, the respective cylinder number, size, current contents, the date when the cylinder will next be checked and the like. Furthermore, it is important to acquire the exact transport route and whereabouts of each cylinder over relatively long periods of time in the past.

Figure 3:
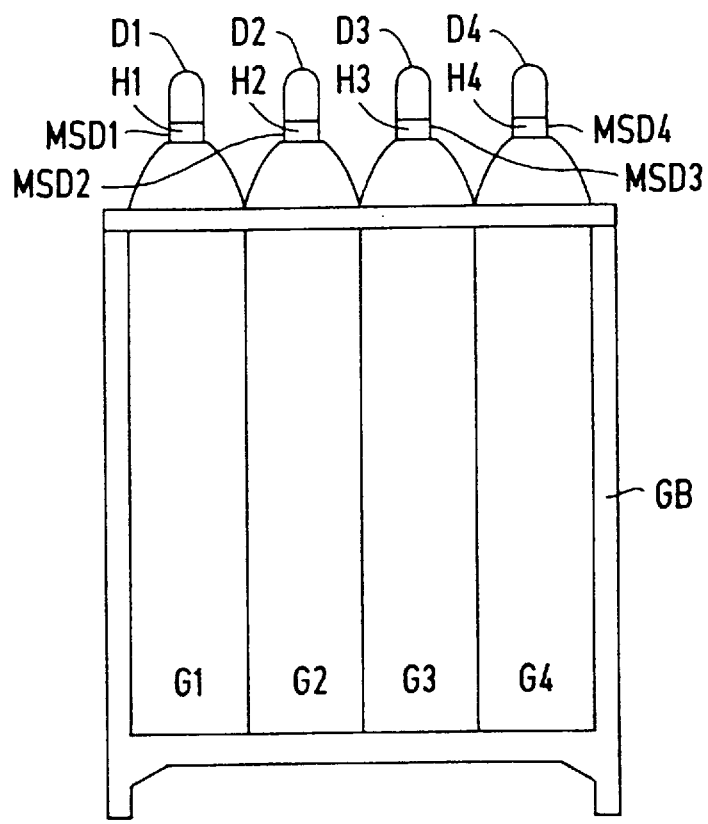
FIG. 3 shows an example of the fitting of mobile data memories of the device according to the invention in the region of the neck rings of gas cylinders according to a preferred use of the device according to the invention.

In the example of FIG. 3, four gas cylinders G1 . . . G4 are brought together standing closely adjacent in a crate GB for the purpose of transport. According to the invention, an elastic carrier, in the form of a strip, of a mobile data memory MDS1 . . . MDS4 is in each case placed around the casing of each gas cylinder G1 . . . G4, preferably in the region of the neckrings H1 . . . H4 thereof, which neckrings are used to mount the cylinder valves and to screw on a cover cap D1 . . . D4 which protects the cylinder valves.

An arrangement of this type has the particular advantage that contactless power and data transmission from a writing and reading device to a mobile data memory fitted to the neck region of a gas cylinder is possible even if the latter is situated in the interior of a crate which is completely filled with further gas cylinders and, possibly, even if a plurality of crates are stacked one over the other. The data transmission can take place from any desired spatial directions, on account of the advantageous configuration of the mobile data memories. Consequently, it is not necessary to rotate the gas cylinders with respect to the their cylinder axis or even to remove them temporarily from the crate. Furthermore, the handling of individual gas cylinders is in no way impeded by a mobile data memory placed in the form of a collar around the neck ring. Finally, the fitting of the mobile data memories in the neck region involves only a very slight risk of mechanical damage.

It is advantageously possible here to use a writing and reading device SLG, designed in accordance with the illustration of FIG. 2, with a separate antenna coil, which is provided on a c-shaped carrier fastened to a retaining rod.

What is claimed:

1. A system for contactless, inductive power and data transmission independently of spatial direction, comprising:
   a) at least one writing and reading unit having an antenna coil; and
   b) at least one mobile data memory, the at least one memory unit including:
      i) a memory;
      ii) an operating circuit;
      iii) an elongate loop coil coupled to the memory and the operating circuit; and
      iv) an elastic carrier on which the memory, the operating circuit and the elongate loop are provided, wherein the elastic carrier and the elongate loop coil are configured so that the elastic carrier and the elongate loop coil are placed onto a casing exterior of an object provided with the mobile data memory and enclose said object substantially in the shape of a ring.

2. The system according to claim 1, wherein the elastic carrier comprises a flexible printed circuit board for supporting the elongate loop coil, the memory, and the operating circuit.

3. The system according to claim 1, wherein the elastic carrier includes a plurality of short end sides for connection to a releasable closure device.

4. The system according to claim 1, wherein the elastic carrier comprises one of an adhesive tape an adhesive film for supporting the elongate loop coil, the memory, and the operating circuit.

5. The system according to claim 1, wherein the antenna coil of the writing and reading unit is provided on a separate elastic carrier.

6. The system according to claim 5, wherein the separate elastic carrier comprises another flexible printed circuit board.

7. The system according to claim 5, wherein the separate elastic carrier has an approximately c-shaped cross section.

8. The system according to claim 5, further comprising a retaining rod, the retaining rod being fitted to the separate elastic carrier.

* * * * *